United States Patent Office 3,271,306
Patented Sept. 6, 1966

3,271,306
METHOD FOR PREVENTING THE FORMATION OF INSOLUBLE IRON COMPOUNDS
Enrico G. Capriati, Texas City, and David T. Oakes, Dickinson, Tex., assignors to Monsanto Company, a corporation of Delaware
No Drawing. Filed Nov. 6, 1963, Ser. No. 321,811
8 Claims. (Cl. 252—8.55)

The present invention relates to the prevention of the formation of water-insoluble compounds in aqueous solutions. More particularly the present invention relates to a method whereby the formation of water-insoluble iron compounds in aqueous solutions may be prevented.

In pipelines carrying large volumes of water and in other utilities such as the secondary recovery of oil by water flooding wherein large quantities of water are used in the presence of iron, the formation of water-insoluble compounds such as $Fe(OH)_3$ is a constant problem. In pipelines and in secondary recovery by water flooding, the formation of these water-insoluble compounds causes partial, and in many instances, complete plugging. Often, these water-insoluble iron compounds may be removed by treatment with strong acids such as HCl or $HNO_3$. However, this is often quite costly because of the quantities of acid necessary and because of damage resulting from the corrosive character of these strong acids. Thus, there is a continuing search for methods whereby the formation of these iron insoluble compounds may be prevented.

It is an object of the present invention to provide a method whereby the formation of water-insoluble iron compounds may be prevented in aqueous solutions. Another object of the present invention is to provide a method of treating aqueous systems to prevent the precipitation of water-insoluble iron compounds. It is also an object of the present invention to provide a method for the prevention of clogging in water carrying channels by the precipitation of water-insoluble iron compounds. Additional objects will become apparent from the following description of the invention herein disclosed.

In fulfillment of these and other objects, it has been found that the addition of minor amounts of haloalkyl phosphonic acids to aqueous systems prevents the formation of water-insoluble iron compounds, particularly $Fe(OH)_3$. The primary advantage of the present invention is found in the fact that it provides a method whereby water-insoluble iron compounds may be prevented from forming in basic and lower acidity aqueous solutions. Depending upon the particular aqueous solution, such iron compounds as ferric hydroxide will begin to precipitate at pH values as low as 3 to 4. The use of haloalkyl phosphonic acids will prevent this precipitation in the acid region about 3 and above and in the basic range of pH as hereinafter illustrated.

The present invention finds particular utility in the prevention of plugging of subterranean petroleum bearing formations during the secondary recovery of oil by water flooding. In the secondary recovery of petroleum by water flooding, water is pressured into a petroleum bearing formation through an injection well from which it is forced into the surrounding formation to drive the petroleum in the formation toward adjacent producing wells. Such water-insoluble iron compounds as $Fe(OH)_3$ are a constant source of difficulty in the operation of water floods because these water-insoluble materials plug the pores of the formation thus reducing the injectivity of the formation. Of course, these water-insolubles can be removed through the use of strong acids such as HCl or $HNO_3$, however, as the acid becomes spent and the pH increases from attacking the iron compounds as well as other materials within the formation, precipitation of the insoluble iron compounds reoccurs. Large quantities of such acids are necessary, however, and they cause damage to pipe and other equipment with which they are in contact during the secondary recovery operation. The present invention provides a particularly useful method of preventing the precipitation of water-insoluble iron compounds within the petroleum bearing formation. Minor amounts of the haloalkyl phosphonic acids of the present invention added to the injection water used in the secondary recovery program prevent the formation and precipitation of these water-insoluble iron compounds.

In order to further describe the present invention, the following example is presented. This example is in no manner to be construed as limiting the present invention.

A solution of $FeCl_3$ in water was prepared by dissolving a sufficient amount of $FeCl_3$ in water under acid conditions to produce an iron concentration of 109 p.p.m. in the solution. To the solution was added approximately 150 p.p.m. of chloromethyl phosphonic acid. The resulting mixture was adjusted to a pH of 9. The mixture was then centrifuged for 30 minutes at 3500 r.p.m. in order to separate from the mixture any $Fe(OH)_3$ formed. On completion of the centrifuging, the supernatant liquid was analyzed for iron by standard iodometric techniques and was found to contain 109 p.p.m. of iron. Thus, no water-insoluble $Fe(OH)_3$ was formed and precipitated from the solution.

The efficacy of the present invention is further demonstrated by the injection of water containing approximately 100 p.p.m. of chloroethyl phosphonic acid into a subterranean petroleum-bearing formation through an injection well centrally disposed in respect to a plurality of adjacent producing wells. The water is forced outward from the injection well in order to drive the petroleum in the formation toward the adjacent producing wells. No plugging within the formation is found to result from the precipitation of ferric hydroxide.

The sequestration agents found to be useful in preventing the formation of water-insoluble iron compounds in aqueous systems in accordance with the present invention are in general the haloalkyl phosphonic acids. These compounds have the general formula $R-PO(OH)_2$, wherein R is a haloalkyl radical, generally of not more than 6 carbon atoms. More often, however, haloalkyl phosphonic acids wherein R is a straight-chain haloalkyl radical of not more than 3 carbon atoms are used. Among the haloalkyl phosphonic acids are such compositions as chloromethyl phosphonic acid, bromomethyl phosphonic acid, bromoethyl phosphonic acid, fluoromethyl phosphonic acid, chloroethyl phosphonic acid, chloropropyl phosphonic acid, bromopropyl phosphonic acid, chlorobutyl phosphonic acid, bromobutyl phosphonic acid, chloropentyl phosphonic acid, chlorohexyl phosphonic acid, bromohexyl phosphonic acid, and the like. The preferred haloalkyl phosphonic acids are the chloroalkyl phosphonic acids and bromoalkyl phosphonic acids with chloromethyl phosphonic acid, chloroethyl phosphonic acid and chloropropyl phosphonic acid being preferred over others. The haloalkyl phosphonic acids may also be used in combinations with one another in the practice of the present invention.

The amount of haloalkyl phosphonic acid used in the practice of the present invention will vary according to the iron concentration expected within the aqueous system. Generally, however, injection of 25 to 1000 p.p.m. of haloalkyl phosphonic acid into the water will prevent formation of the water-insoluble iron compounds. Preferably, however, the amount of haloalkyl phosphonic acid in the water ranges from approximately 50 to 500 p.p.m.

The manner in which the haloalkyl phosphonic acid is added to the aqueous system is immaterial to the present invention. It may be added continuously in small amounts or added in larger amounts at intervals. The mechanics of the addition will of course vary with the aqueous system to which the present invention is applied. In using the present invention to prevent formation of water-insoluble iron compounds in the secondary recovery of petroleum by water flooding, the haloalkyl phosphonic acid may be added and intermixed with the injection water at the surface or introduced into the formation and into admixture with the injection water by separate means.

What is claimed is:

1. The method of preventing the formation of water-insoluble $Fe(OH)_3$ in aqueous systems in the presence of iron capable of forming said $Fe(OH)_3$ which comprises adding to said aqueous system 25 to 1000 p.p.m. of a haloalkyl phosphonic acid of no greater than 6 carbon atoms.

2. The method of claim 1 wherein the haloalkyl phosphonic acid is present in the aqueous system in the amount of 50 to 500 p.p.m.

3. The method of claim 1 wherein the haloalkyl phosphonic acid is one selected from the group consisting of chloroalkyl phosphonic acids and bromoalkyl phosphonic acids.

4. The method of claim 3 wherein the haloalkyl phosphonic acid is selected from the group consisting of chloromethyl phosphonic acid, chloroethyl phosphonic acid, chloropropyl phosphonic acid and mixtures thereof.

5. The method of preventing the formation of water-insoluble $Fe(OH)_3$ in subterranean petroleum-bearing formations during the secondary recovery of petroleum by water flooding, said method comprising adding 25 to 1000 p.p.m. of a haloalkyl phosphonic acid containing no greater than 6 carbon atoms to the secondary recovery injection water.

6. The method of claim 5 wherein the haloalkyl phosphonic acid is present in the aqueous system in the amount of 50 to 500 p.p.m.

7. The method of claim 5 wherein the haloalkyl phosphonic acid is one selected from the group consisting of chloroalkyl phosphonic acids and bromoalkyl phosphonic acids.

8. The method of claim 7 wherein the haloalkyl phosphonic acid is selected from the group consisting of chloromethyl phosphonic acid, chloroethyl phosphonic acid, chloropropyl phosphonic acid and mixtures thereof.

References Cited by the Examiner

UNITED STATES PATENTS

| | | |
|---|---|---|
| 2,128,161 | 8/1938 | Morgan. |
| 2,230,371 | 2/1941 | Bolton. |
| 2,559,754 | 7/1951 | Bittles et al. _____ 252—357 |
| 2,874,184 | 2/1959 | Van Winkle et al. |
| 3,021,279 | 2/1962 | Scanley. |
| 3,177,144 | 4/1965 | Reamer et al. |

FOREIGN PATENTS 1,045,373   12/1958   Germany.

LEON D. ROSDOL, *Primary Examiner.*

JULIUS GREENWALD, ALBERT T. MEYERS,
*Examiners.*

H. B. GUYNN, *Assistant Examiner.*